United States 1 [11] 3,612,662

[72] Inventor Harold N. Sissel
Glendale, Calif.
[21] Appl. No. 54,301
[22] Filed July 13, 1970
[45] Patented Oct. 12, 1971
[73] Assignee Xerox Corporation
Stamford, Conn.

[54] EYEPIECE HAVING A WIDE FIELD OF VIEW AND A LARGE EYE RELIEF
1 Claim, 2 Drawing Figs.

[52] U.S. Cl. .......................................... 350/214,
350/175 E
[51] Int. Cl. .......................................... G02b 9/64,
G02b 25/04
[50] Field of Search ............................ 350/214,
175 E

[56] References Cited
OTHER REFERENCES

Winkler " Spherizing a Seven-Power, Wide-Field Eyepiece Design" Applied Optics Vol. 5, No. 9, Sept. 1966, pages 1371– 1373. 350/175 (E).

*Primary Examiner*—John K. Corbin
*Attorneys*—James J. Ralabate, John E. Beck, Franklyn C. Weiss and Irving Keschner ABSTRACT: An eyepiece having a wide field of view and a large eye relief. The eyepiece is made up, going from the front to the rear, of a double convex singlet, a negative meniscus-shaped doublet concave to the front, a positive meniscus-shaped doublet concave to the front, a double concave singlet, two double convex singlets and a positive meniscus-shaped doublet convex to the front.

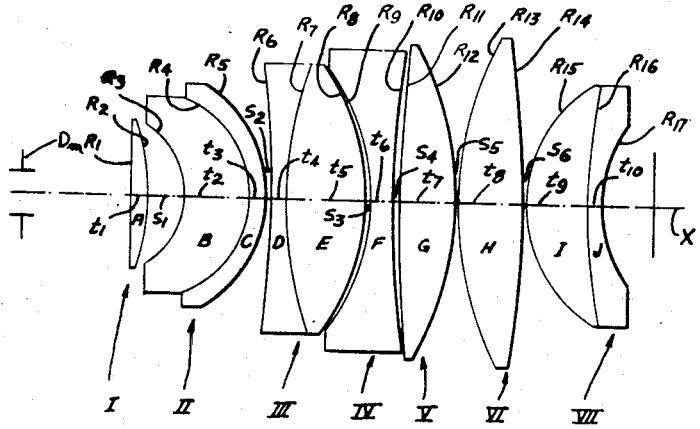

PATENTED OCT 12 1971

3,612,662

Fig. 1.

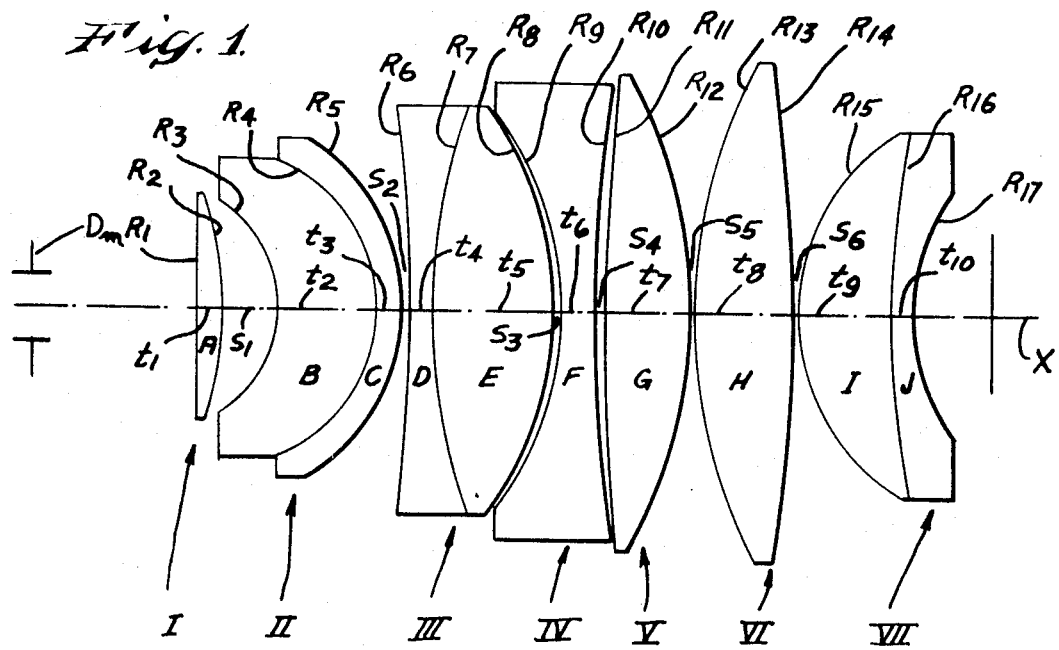

| COMPONENT | ELEMENT | RADII | THICKNESS OR SPACING | N | V |
|---|---|---|---|---|---|
| I | A | $R_1 = 312.9907$ | $t_1 = 0.141$ | 1.788 | 47.4 |
|   |   | $R_2 = -2.2219$ | $S_1 = 0.342$ |   |   |
| II | B | $R_3 = -0.6978$ | $t_2 = 0.588$ | 1.788 | 47.4 |
|   | C | $R_4 = -0.9278$ | $t_3 = 0.151$ | 1.785 | 26.1 |
|   |   | $R_5 = -1.1067$ | $S_2 = 0.009$ |   |   |
| III | D | $R_6 = -8.9646$ | $t_4 = 0.184$ | 1.785 | 26.1 |
|   | E | $R_7 = 3.5312$ | $t_5 = 0.720$ | 1.788 | 47.4 |
|   |   | $R_8 = -1.8534$ | $S_3 = 0.094$ |   |   |
| IV | F | $R_9 = -1.6149$ | $t_6 = 0.189$ | 1.785 | 26.1 |
|   |   | $R_{10} = 6.9647$ | $S_4 = 0.080$ |   |   |
| V | G | $R_{11} = 14.0429$ | $t_7 = 0.486$ | 1.788 | 47.4 |
|   |   | $R_{12} = -2.9455$ | $S_5 = 0.008$ |   |   |
| VI | H | $R_{13} = 2.7428$ | $t_8 = 0.660$ | 1.788 | 47.4 |
|   |   | $R_{14} = -8.7420$ | $S_6 = 0.009$ |   |   |
| VII | I | $R_{15} = 1.2912$ | $t_9 = 0.560$ | 1.788 | 47.4 |
|   | J | $R_{16} = 7.1641$ | $t_{10} = 0.141$ | 1.785 | 26.1 |
|   |   | $R_{17} = 1.3334$ |   |   |   |

E.F.L. = 1.0799
F.O.V. = 48.98°
OVERALL LENGTH = 5.88
EYE RELIEF = 1.1011

EXIT PUPIL = 0.3937
B.F.L. = 0.419
DISTORTION AT 24.49° = 0.38%

Fig. 2.

INVENTOR.
Harold N. Sissel
BY
Irving M. Kriegsman
ATTORNEY.

EYEPIECE HAVING A WIDE FIELD OF VIEW AND A LARGE EYE RELIEF

This invention relates to eyepieces. More particularly, this invention relates to an eyepiece that is especially suited for use in night vision devices or systems but not exclusively limited thereto.

Eyepieces are well known in the art. Examples of eyepieces can be found in U.S. Pat. No. 2,549,158, U.S. Pat. No. 2,621,564 and U.S. Pat. No. 3,384,434.

It is an object of this invention to provide a new and improved eyepiece.

It is another object of this invention to provide a high-performance eyepiece.

It is still another object of this invention to provide an eyepiece that has a wide field of view and a large eye relief.

It is yet still another object of this invention to provide an eyepiece that has a large exit pupil.

It is another object of this invention to provide an eyepiece whose overall length is relatively short.

It is still another object of this invention to provide an eyepiece that is inexpensive, is lightweight and has low distortion.

It is yet still another object of this invention to provide an eyepiece that does not contain any aspheric surfaces.

The above and other objects are achieved by constructing an eyepiece according to this invention. Briefly, the eyepiece is made up, going from the front to the rear, of a double convex singlet, a negative meniscus-shaped doublet concave to the front, a positive meniscus-shaped doublet concave to the front, a double concave singlet, two double convex singlets and a positive meniscus-shaped doublet convex to the front.

In the drawings:

FIG. 1 is an optical diagram of an eyepiece constructed according to this invention; and FIG. 2 is a chart of constructional data related to the eyepiece shown in FIG. 1.

Referring to the drawings, there is shown in FIG. 1 an optical diagram of an eyepiece constructed according to this invention. The eyepiece is made up of seven lens components identified in ascending order by reference numerals I through VII going from the front to the rear (i.e., from the left to the right in the drawing).

Component I is a double convex single element A. Component II is a negative meniscus-shaped doublet concave to the front and is made up of a negative meniscus-shaped element B concave to the front and a negative meniscus-shaped element C concave to the front. Component III is a positive meniscus-shaped doublet concave to the front and is made up of a double concave element D and a double convex element E. Component IV is a double concave single element F. Component V is a double convex single element G. Component VI is made up of double convex single element H. Component VII is a positive meniscus-shaped doublet convex to the front and is made up of a positive meniscus element I convex to the front and a negative meniscus element J convex to the front.

The exit pupil $Dm$ is in front of the first element A.

The constructional data for one embodiment of the eyepiece is shown in FIG. 2 and repeated in the following table.

In FIG. 2 and in the table the letter N stands for the index of refraction, the letter V stands for the Abbe number, the unit for all the numbers is inches unless otherwise specified, a minus sign in front of a radius denotes that the surface is concave to the front (i.e., in the direction towards the eye) and no sign in front of a radius denotes that the surface is convex to the front.

| Component | Element | Radii | Thickness or spacing | N | V |
|---|---|---|---|---|---|
| I | A | $R_1=312.9907$ | $t_1=0.141$ | 1.788 | 47.4 |
|   |   | $R_2=-2.2219$ | $s_1=0.342$ |   |   |
| II | B | $R_3=-0.6978$ | $t_2=0.588$ | 1.788 | 47.4 |
|   | C | $R_4=-0.9278$ | $t_3=0.151$ | 1.785 | 26.1 |
|   |   | $R_5=-1.1067$ | $s_2=0.009$ |   |   |
| III | D | $R_6=-8.9646$ | $t_4=0.184$ | 1.785 | 26.1 |
|   | E | $R_7=3.5312$ | $t_5=0.720$ | 1.788 | 47.4 |
|   |   | $R_8=-1.8534$ | $s_3=0.094$ |   |   |
| IV | F | $R_9=-1.6149$ | $t_6=0.189$ | 1.785 | 26.1 |
|   |   | $R_{10}=6.9647$ | $s_4=0.080$ |   |   |
| V | G | $R_{11}=14.0429$ | $t_7=0.486$ | 1.788 | 47.4 |
|   |   | $R_{12}=-2.9455$ | $s_5=0.008$ |   |   |
| VI | H | $R_{13}=2.7428$ | $t_8=0.660$ | 1.788 | 47.4 |
|   |   | $R_{14}=-8.7420$ | $s_6=0.009$ |   |   |
| VII | I | $R_{15}=1.2912$ | $t_9=0.560$ | 1.788 | 47.4 |
|   | J | $R_{16}=7.1641$ | $t_{10}=0.141$ | 1.785 | 26.1 |
|   |   | $R_{17}=1.3334$ |   |   |   |

NOTE: E.F.L.=1.0799; F.O.V.=48.98°; Overall Length=5.88; Eye Relief=1.1011; Exit Pupil=0.3937; B.F.L.=0.419; Distortion at 24.49°=0.38%.

What is claimed is:

1. An eyepiece made substantially according to the following specifications, wherein the components are designated by Roman numerals in ascending order from the front to the rear;

| Component | Element | Radii | Thickness or spacing | N | V |
|---|---|---|---|---|---|
| I | A | $R_1=312.9907$ | $t_1=0.141$ | 1.788 | 47.4 |
|   |   | $R_2=-2.2219$ | $s_1=0.342$ |   |   |
| II | B | $R_3=-0.6978$ | $t_2=0.588$ | 1.788 | 47.4 |
|   | C | $R_4=-0.9278$ | $t_3=0.151$ | 1.785 | 26.1 |
|   |   | $R_5=-1.1067$ | $s_2=0.009$ |   |   |
| III | D | $R_6=-8.9646$ | $t_4=0.184$ | 1.785 | 26.1 |
|   | E | $R_7=3.5312$ | $t_5=0.720$ | 1.788 | 47.4 |
|   |   | $R_8=-1.8534$ | $s_3=0.094$ |   |   |
| IV | F | $R_9=-1.6149$ | $t_6=0.189$ | 1.785 | 26.1 |
|   |   | $R_{10}=6.9647$ | $s_4=0.080$ |   |   |
| V | G | $R_{11}=14.0429$ | $t_7=0.486$ | 1.788 | 47.4 |
|   |   | $R_{12}=-2.9455$ | $s_5=0.008$ |   |   |
| VI | H | $R_{13}=2.7428$ | $t_8=0.660$ | 1.788 | 47.4 |
|   |   | $R_{14}=-8.7420$ | $s_6=0.009$ |   |   |
| VII | I | $R_{15}=1.2912$ | $t_9=0.560$ | 1.788 | 47.4 |
|   | J | $R_{16}=7.1641$ | $t_{10}=0.141$ | 1.785 | 26.1 |
|   |   | $R_{17}=1.3334$ |   |   |   |

NOTE: E.F.L.=1.0799; F.O.V.=48.98°; Overall Length=5.88; Eye Relief=1.1011; Exit Pupil=0.3937; B.F.L.=0.419; Distortion at 24.49°=0.38%.